United States Patent Office 3,471,498
Patented Oct. 7, 1969

3,471,498
CERTAIN N-p-[(2,4-DIAMINO-6-QUINAZOLINYL)-METHYL]BENZOYLAMINO ACIDS
John Davoll, Shepperton, England, assignor to Parke, Davis & Company, Detroit, Mich., a corporation of Michigan
No Drawing. Continuation-in-part of application Ser. No. 531,095, Mar. 2, 1966. This application Aug. 11, 1967, Ser. No. 659,873
Int. Cl. C07d 51/48; A61k 25/00
U.S. Cl. 260—256.4                    19 Claims

ABSTRACT OF THE DISCLOSURE

Diaminoquinazolinylmethylaminobenzoylamino acids (I):

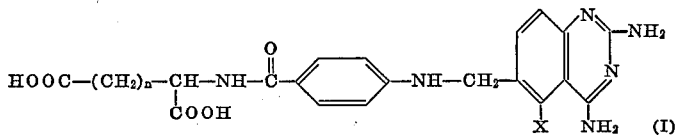

are prepared by hydrolyzing the corresponding lower alkyl diesters; where $n$ is the integer 0, 1 or 2, and X is a hydrogen or chlorine atom or a methyl group. The compounds possess pharmacological properties (antifolic, antithiamine and erythrocyte agglutination suppression activity as well as bacteriostatic activity). The products are useful antimetabolites and bacteriostatic agents.

Summary and detailed description

This application is a continuation-in-part of co-pending application Ser. No. 531,095 filed Mar. 2, 1966, now abandoned.

This invention relates to novel chemical compounds and means of producing the same. More particularly, this invention relates to novel dibasic acid compounds derivable from malonic, aspartic and glutamic acid and the corresponding di-salts of the acid compounds, which compounds in acid form have the formula:

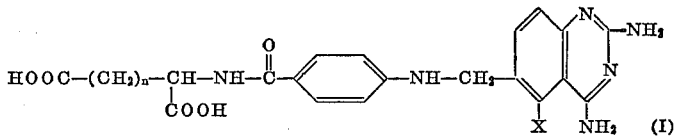

where $n$ is the integer 0, 1 or 2 and X is a hydrogen or chlorine atom or a methyl group. Like aspartic and glutamic acid, the compounds where $n$ is 1 or 2 (and which have by that fact an asymmetric carbon atom) exist in either of the two optically active D- and L-forms and also in the optically racemic DL-form, all three of which forms as well as mixtures thereof are contemplated by the invention.

In accordance with the invention, compounds having Formula I are produced by reacting an N-{p-{[(2,4-diamino - 6 - quinazolinyl)methyl]amino}benzoyl}-amino acid, lower alkyl diester of formula:

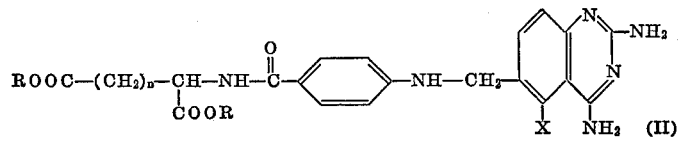

with an acidic or basic hydrolytic agent, under mild conditions; where R is a lower alkyl (i.e., a $C_1$ to $C_4$ alkyl and preferably methyl or ethyl) group, and $n$ and X have the same meaning specified above.

Where the object is to obtain a product with a particular optical form (either D, L or DL), one uses the amino acid diester starting material having the same form.

For the acid hydrolysis a mineral acid such as hydrochloric acid is the preferred hydrolytic agent; for basic hydrolysis, one may use any suitable alkali metal hydrolytic agent such as an alkali metal hydroxide or carbonate. Sodium hydroxide is preferred for hydrolysis. As will be understood, the product obtained by acid hydrolysis is the free di-acid whereas the product of basic hydrolysis is the di-salt. The latter product can be isolated as the di-acid after treatment with acid and, conversely, the acid product can be isolated as the di-salt after neutralization with the appropriate base. A variety of organic and inorganic bases can be used such as sodium hydroxide, potassium hydroxide, calcium hydroxide, sodium carbonate, ammonia, 2-hydroxyethylamine and choline. In obtaining the di-salt, it is preferred for optimum yields to use only the amount (or a slight excess) of base required for formation of the di-salt. Larger amounts may cause decreased yields of the desired product. As a solvent for the hydrolysis, one may employ any of various aqueous, water-miscible non-reactive organic solvents. These include lower alkanols such as methanol, ethanol and isopropanol; ethers such as dioxane, tetrahydrofuran, and diethylene glycol dimethyl ether; glycols such as ethylene and diethylene glycol; and mixtures of these solvents. Hydrolysis is conveniently carried out at or below room temperature; at higher temperature yields are less satisfactory. At room temperature (20–25° C.) the reaction is essentially complete within 24 hours.

The compounds of the invention possess pharmacological properties such as antimetabolic (antifolic acid) activity. Some of the compounds possess antithiamine activity and erythrocyte agglutination suppression (EAS) activity. The specified properties are demonstrable by standard tests. In the inhibition test (cf. D. W. Woolley, A Study of Antimetabolites, John Wiley & Sons, New York, 1952, pp. 66–68), for example, antifolic activity can be shown similar to that of the known antifolic substance aminopterin. The aspartic and glutamic acid compounds of the invention which are active antifolics in the aforementioned D-, L-, and DL-forms are preferred in the L-form. Thiamine antagonism can be demonstrated (e.g. typically of the order of one milligamma/ml. for 50% inhibition of growth) by a standard method based on that reported by McGlohon, Peterson and Bird, Canadian Journal of Microbiology, 3, 569, 1957. The compounds therefore are useful as antimetabolites for those applications in which it is desired to antagonize folic acid activity and/or thiamine activity and thereby inhibit metabolic growth. The compounds also have bacteriostatic activity and as shown in standard tests in relatively low concentration (for example, 50% inhibition at concentrations of the order of 10 gammas/ml.) provide inhibition of organisms such as S. faecalis R., L. plantarum, and L. casei. The compounds are therefore also useful as bacteriostatic agents for topical application or in aqueous systems for the inhibition of undersirable effects produced by bacteria. For example, the compounds can be used in dilute solution for the prevention of milk spoilage; they can also be used in solution to minimize decomposition and gas formation in self-contained sanitary disposal or sewage units. The compounds which suppress erythrocyte agglutination are useful orally or parenterally for the suppression of the normal immune (hemagglutination) response. For example, the malonic acid di-sodium salt product of Formula I where X is hydrogen is active in the mouse at 10 mg. per kg. (s.c. at day 0 and day 1) to provide complete suppression of hemagglutination at day 5, when tested according to a standard procedure described by Nathan et al., Proc. Soc. Exp. Biol. Med., 107, 796, 1961; similarly, the corresponding L-glutamic acid di-salt where X is methyl gives complete suppression at 5 mg. per kg.

The invention is illustrated by the following examples.

Example 1

(a) A solution of 5.50 g. of diethyl N-{p-{[(2,4-diamino-6-quinazolinyl)methyl]amino}benzoyl}-L-aspartate monohydrate in 110 ml. of ethanol is cooled and treated at 20° C. with 12.1 ml. of 2.0 N aqueous sodium hydroxide. In a few minutes a granular precipitate begins separating. The mixture is then kept at room temperature for 24 hours. The solid product, N-{p-{[(2,4-diamino-6-quinazolinyl)methyl]amino}benzoyl}-L-aspartic acid, disodium salt, heptahydrate, is collected by filtration, washed with ethanol and dried.

The free acid, N-{p-{[(2,4-diamino-6-quinazolinyl)methyl]amino}benzoyl}-L-aspartic acid, is obtained by dissolving the disodium salt heptahydrate in water and treating the solution with two molar equivalents of dilute hydrochloric acid. The precipitated free acid is removed by filtration, washed with water and dried; M.P. 269–271° C. with decomposition.

By starting with the D- or DL-aspartate diethyl ester instead of the L-form as in the foregoing procedure, the corresponding substituted D- or DL-aspartic acid disodium salt and free acid are obtained.

(b) The dialkyl ester starting material used in Example 1(a) can be prepared by the following procedure, which procedure is illustrative of the general method which can be employed for the preparation of starting materials of the instant dialkyl type: A solution of 1.91 kg. of guanidine hydrochloride is treated with an ethanolic solution of sodium ethoxide prepared from 460 g. of sodium and 17.5 liters of absolute ethanol. There is then added 1.83 kg. of 2-chloro-5-nitrobenzonitrile and the mixture is stirred and heated at reflux for 3.5 hours. The mixture is cooled; the solid product, 2,4-diamino-6-nitroquinazoline, is collected by filtration, washed well with water and dried.

A mixture of 400 g. of the latter product, 2.0 liters of dimethylformamide and 20 g. of 10% palladium on charcoal is hydrogenated at 1000 p.s.i. and 100° C. until the required amount of hydrogen is taken up (about 1 hour or less). The mixture is cooled, filtered, and the filtrate is evaporated to dryness giving 2,4,6-triaminoquinazoline; M.P. 255–258° C. after decolorization with charcoal and recrystallization from water.

To a solution of 42 g. of the latter product in 500 ml. of 2 N hydrochloric acid cooled by an ice bath is added with stirring a solution of 17.28 g. of sodium nitrite in 120 ml. of water over a period of 10–15 minutes. The resulting diazonium salt solution is then added slowly, with stirring, to a solution prepared by adding a cold solution of 56.4 g. of cupric sulfate pentahydrate in 180 ml. of water to a solution of 67.2 g. of potassium cyanide in 120 ml. of water. When the addition of the diazonium salt solution is complete, the solution is heated at 50–55° C. for 1 hour, then allowed to cool to 40° C. To this solution is added 240 ml. of aqueous ammmonia (d.=0.880) and the mixture is stirred 1 hour at room temperature. The solid product, 2,4-diamino-6-quinazoline-carbonitrile, in crude form, is removed by filtration, washed with dilute aqueous ammonia and with water, and extracted with a boiling solution of 110 ml. of glacial acetic acid in 550 ml. of water. The hot extract is treated with charcoal and filtered. The filtrate, while hot, is diluted with 550 ml. of cold 2-ethoxyethanol and 200 ml. of aqueous ammonia (d.=0.880). The resulting mixture is allowed to stand at room temperature for 24 hours. The product, 2,4-diamino-6-quinazolinecarbonitrile, is collected by filtration, washed in turn with water, ethanol and ether, and dried.

To a solution of 11.1 g. of diethyl N-(p-aminobenzoyl)-L-aspartate in 90 ml. of cold glacial acetic acid is added 45 ml. of water, 5.55 g. of 2,4-diamino-6-quinazolinecarbonitrile and 1.0 g. of Raney nickel. The mixture is shaken with hydrogen at room temperature and atmospheric pressure until uptake ceases (about 3 hours). The catalyst is removed by filtration and the filtrate evaporated at reduced pressure to a volume of about 20 ml. The resulting syrup is poured with stirring into 300 ml. of 2 N aqueous sodium carbonate. The resulting precipitate, which solidifies on standing, is collected and triturated with 300 ml. of fresh 2 N aqueous sodium carbonate. The product, diethyl N-{p-{[(2,4-diamino-6-quinazolinyl)methyl]amino}benzoyl}-L-aspartate, is removed by filtration, washed with water, dried and crystallized from ethanol, employing a charcoal treatment; M.P. 174–177° C.

By substituting an equivalent amount of diethyl N-(p-aminobenzoyl)-D-aspartate or diethyl N-(p-aminobenzoyl)-DL-aspartate for the diethyl N-(p-aminobenzoyl)-L-aspartate, the corresponding diethyl N-{p-{[(2,4-diamino-6-quinazolinyl)-methyl]amino}benzoyl}-D-aspartate or diethyl N - {p - {[(2,4-diamino-6-quinazolinyl)methyl]amino}benzoyl}-DL-aspartate is obtained.

(c) Using an ethanol solution of the free acid product obtained as in Example 1(a), the corresponding potassium, ammonium and ethanolamine di-salts are prepared by treating the solution with two molar equivalents of the respective base, potassium hydroxide, ammonia or 2-hydroxyethylamine, in an aqueous solution, and recovering the solid product which separates on standing.

Example 2

(a) A solution of 9.20 g. of diethyl N-{p-{[(2,4-diamino-6-quinazolinyl)methyl]amino}benzoyl}-L-glutamate in 35 ml. of ethanol is treated with 18 ml. of 2 N aqueous sodium hydroxide and the solution kept at 20° C. for 18 hours. The resulting clear solution is treated with charcoal and filtered. The filtrate (containing N-{p-{[(2,4-diamino - 6 - quinazolinyl)methyl]amino}benzoyl}-L-glutamic acid, disodium salt, which can be isolated if desired, by precipitation after concentration and cooling) is treated with 18 ml. of 2 N hydrochloric acid. The resulting precipitate, after decantation of supernatant solution, is stirred with 50 ml. of water and the product collected. The product is N-{p-{[(2,4-diamino-6-quinazolinyl)methyl]amino}benzoyl}-L-glutamic acid; M.P. 255–258° C. with decomposition, after decolorization with charcoal and recrystallization from 50% aqueous ethanol.

By starting in the above procedure with the D- or

DL-glutamate ester instead of the L-isomer, the corresponding D- or DL-glutamic acid is obtained.

(b) The starting material for Example 2(a), diethyl N-{p-{[(2,4-diamino-6-quinazolinyl)methyl]amino}benzoyl}-L-glutamate, can be prepared from diethyl N-(p-aminobenzoyl)-L-glutamate and 2,4-diamino-6-quinazolinecarbonitrile, following the hydrogenation procedure of Example 1(b).

In a similar manner, from diethyl N-(p-aminobenzoyl)-D-glutamate or diethyl N-(p-aminobenzoyl)-DL-glutamate, the corresponding diethyl N-{p-{[(2,4-diamino-6-quinazolinyl)methyl]amino}benzoyl}-D-glutamate or diethyl N-{p-{[(2,4-diamino-6-quinazolinyl)methyl]amino}benzoyl}-DL-glutamate is obtained.

Example 3

(a) A solution of 1.88 g. of diethyl N-{p-{[(2,4-diamino-5-methyl-6-quinazolinyl)methyl]amino}benzoyl}-L-aspartate in 110 ml. of ethanol is cooled to 20° C. and treated with 4.18 ml. of 2.0 N aqueous sodium hydroxide. The mixture is allowed to stand at room temperature for 18 hours. The solid product which separates, N-{p-{[(2,4-diamino-5-methyl-6-quinazolinyl)methyl]amino}benzoyl}-L-aspartic acid, disodium salt, pentahydrate, is collected by filtration, washed with ethanol and dried.

The corresponding free acid product, N-{p-{[(2,4-diamino-5-methyl-6-quinazolinyl)methyl]amino}benzoyl}-L-aspartic acid, is obtained by dissolving the disodium salt pentahydrate in water and treating the solution with two molar equivalents of dilute hydrochloric acid. The precipitated free acid is removed by filtration, washed with water and dried; M.P. 269–271° C. with decomposition.

By starting with an equivalent amount of the corresponding D-aspartate, DL-aspartate, L-glutamate, D-glutamate or DL-glutamate diethyl ester in the foregoing procedure, the respective D- or DL-aspartic acid or L-, D- or DL-glutamic acid disodium salt and free acid are obtained.

(b) The dialkyl ester starting material for Example 3(a) can be prepared by the following illustrative procedure: 6-chloro-o-tolunitrile (60 g.) is added in portions with stirring in the cold (−15 to −10° C.) to fuming nitric acid (300 ml.; density, 1.5). The mixture is allowed to stand for 24 hours at room temperature, and is then added, with stirring, to 4.5 liters of ice water. The solid which separates, 6-chloro-3-nitro-o-tolunitrile, is collected and recrystallized from aqueous ethanol; M.P. 75–80° C. A mixture of 20 g. of the latter product, 38 g. of guanidine carbonate and 1.0 liter of 2-ethoxyethanol is heated at reflux for 3.5 hours. The solution is evaporated at reduced pressure and the residue triturated with 20 ml. of water. The crude 2,4-diamino-5-methyl-6-nitroquinazoline is collected by filtration and dissolved in 200 ml. of hot 80% aqueous acetic acid. The solution is filtered, diluted with 30 ml. of 6 N aqueous ammonia and chilled to crystallize the acetate salt of 2,4-diamino-5-methyl-6-nitroquinazoline; M.P. 288° C. with decomposition. A mixture of 9.0 g. of the quinazoline product, 500 ml. of ethanol and 1.0 g. of 10% palladium on charcoal is shaken with hydrogen at atmospheric pressure and 45° C. until hydrogen uptake ceases. The mixture is filtered and the filtrate concentrated to a volume of 50 ml. and chilled to crystallize 2,4,6-triamino-5-methylquinazoline; M.P. 220–222° C. To a solution of 3.78 g. of this product in 42 ml. of 2 N hydrochloric acid cooled by an ice bath is added, with stirring, a solution of 1.44 g. of sodium nitrite in 10 ml. of water over a period of 10–15 minutes. The resulting diazonium salt solution is then added slowly, with stirring, to a solution prepared by adding a cold solution of 4.7 g. of cupric sulfate pentahydrate in 15 ml. of water to a solution of 5.6 g. of potassium cyanide in 10 ml. of water. When the addition of the diazonium salt solution is complete, the solution is heated at 50–55° C. for one hour, then allowed to cool to 40° C. To this solution is added 20 ml. of aqueous ammonia (d.=0.880) and the mixture is stirred one hour at room temperature. The solid product, 2,4-diamino-5-methyl-6-quinazolinecarbonitrile, in crude form, is removed by filtration, washed with dilute aqueous ammonia and with water, and extracted with 150 ml. of boiling 20% aqueous acetic acid. The hot extract is treated with charcoal and filtered. The filtrate, while hot, is diluted with 100 ml. of 2-ethoxyethanol and 60 ml. of aqueous ammonia (d.=0.880). The mixture is cooled and the product, 2,4-diamino-5-methyl-6-quinazolinecarbonitrile hemihydrate, is collected by filtration, washed in turn with water, ethanol and ether, and dried; M.P. 285° C. with decomposition. To a solution of 1.04 g. of the latter product in 23 ml. of 66% aqueous acetic acid is added 1.85 g. of diethyl N-(p-aminobenzoyl)-L-aspartate and 0.2 g. of Raney nickel. The mixture is shaken with hydrogen at 20° C. and atmospheric pressure until uptake ceases. The catalyst is removed by filtration and the filtrate evaporated at reduced pressure. The residue is stirred with 30 ml. of 2 N aqueous sodium carbonate until granular. The product, diethyl N-{p-{[(2,4-diamino-5-methyl-6-quinazolinyl)methyl]amino}benzoyl}-L-aspartate, is removed by filtration, washed with water, dried and twice crystallized from ethanol, employing a charcoal treatment; M.P. 211–212° C.

By the same procedure but substituting an equivalent amount of diethyl N-(p-aminobenzoyl)-D-aspartate, diethyl N-(p-aminobenzoyl)-DL-aspartate, diethyl N-(p-aminobenzoyl)-L-glutamate, diethyl N-(p-aminobenzoyl)-D-glutamate or diethyl N-(p-aminobenzoyl)-DL-glutamate for the diethyl N-(p-aminobenzoyl)-L-aspartate, the respective products are:

Diethyl N-{p-{[(2,4-diamino-5-methyl-6-quinazolinyl)methyl]amino}benzoyl}-D-aspartate;

Diethyl N-{p-{[(2,4-diamino-5-methyl-6-quinazolinyl)methyl]amino}benzoyl}-DL-aspartate;

Diethyl N-{p-{[(2,4-diamino-5-methyl-6-quinazolinyl)methyl]amino}benzoyl}-L-glutamate hemihydrate; M.P. 189–191° C.;

Diethyl N-{p-{[(2,4-diamino-5-methyl-6-quinazolinyl)methyl]amino}benzoyl}-D-glutamate;

Diethyl N-{p-{[(2,4-diamino-5-methyl-6-quinazolinyl)methyl]amino}benzoyl}-DL-glutamate.

Example 4

(a) A solution of 1.96 g. of diethyl N-{p-{[2,4-diamino-5-chloro-6-quinazolinyl)methyl]amino}benzoyl}-L-aspartate in 110 ml. of ethanol is cooled to 20° C. and treated with aqueous sodium hydroxide (2 N; 4.18 ml.). The mixture is held overnight at room temperature and the solid product separated is collected by filtration, washed with ethanol and dried. The product is N-{p-{[2,4-diamino-5-chloro-6-quinazolinyl)methyl]-amino}benzoyl}-L-aspartic acid disodium salt. The corresponding free acid is obtained as the solid product which separates when an aqueous solution of the disodium salt is treated with two molar equivalents of dilute hydrochloric acid.

In the same way the following acid compounds are obtained by hydrolyzing in each case its respective diethyl ester by way of the corresponding disodium salt:

N-{p-{[(2,4-diamino-5-chloro-6-quinazolinyl)-methyl]amino}benzoyl}-D-aspartic acid;

N-{p-{[(2,4-diamino-5-chloro-6-quinazolinyl)-methyl]amino}benzoyl}-DL-aspartic acid;

N-{p-{[(2,4-diamino-5-chloro-6-quinazolinyl)-methyl]amino}benzoyl}-L-glutamic acid;

N-{p-{[(2,4-diamino-5-chloro-6-quinazolinyl)-methyl]amino}benzoyl}-D-glutamic acid;

N-{p-{[(2,4-diamino-5-chloro-6-quinazolinyl)-methyl]amino}benzoyl}-DL-glutamic acid.

(b) The dialkyl ester starting material for Example 4(a) can be prepared by the following illustrative procedure: A mixture of 37 g. of 6-chloroanthranilonitrile and 34.3 g. of cyanamide dihydrochloride in 240 ml. of diethylene glycol dimethyl ether is stirred and heated at 145–150° C. for 2.5 hours. The mixture is cooled, diluted with 700 ml. of ether and the precipitated crude product, 2,4-diamino-5-chloroquinazoline hydrochloride, is collected and powdered. The crude product is stirred with 2.5 liters of boiling water; the mixture is basified with aqueous ammonia, treated with charcoal and filtered. The hot filtrate is chilled and the crystalline product, 2,4-diamino-5-chloroquinazoline, removed by filtration. After recrystallization from water the product melts at 183–185° C. To a stirred mixture of 270 ml. of fuming nitric acid (d.=1.5) and 270 ml. of concentrated sulfuric acid is added portionwise, over a 2.5 hour period, 50 g. of 2,4-diamino-5-chloroquinazoline, while keeping the temperature below 20° C. The resulting solution is allowed to stand for 18 hours, then poured onto 3 kg. of crushed ice. The mixture is basified with aqueous ammonia (d.=0.880) while adding ice to maintain the temperature below 40° C. The solid product, 2,4-diamino-5-chloro-6-nitroquinazoline, is collected, washed with water and dried. To a stirred solution of 65 g. of stannous chloride dihydrate in 350 ml. of concentrated hydrochloric acid and 92 ml. of acetic acid is added below 30° C. 22.1 g. of 2,4-diamino-5-chloro-6-nitroquinazoline and the mixture is stirred 18 hours at 20° C. The precipitate is collected by filtration, washed with minimum amounts of concentrated hydrochloric acid and water, and then suspended in ice water. The mixture is basified with 40% aqueous sodium hydroxide while adding ice to maintain the temperature below 40° C. The solid product, 2,4,6-triamino-5-chloroquinazoline monohydrate, is collected, washed with water and dried; M.P. 200–203° C. after recrystallization from water following charcoal treatment. To a mixture of 4.55 g. of 2,4,6-triamino-5-chloroquinazoline monohydrate and 42 ml. of 2 N hydrochloric acid cooled by an ice bath is added with stirring a solution of 1.44 g. of sodium nitrite in 10 ml. of water over a period of 10–15 minutes. The resulting diazonium salt solution is then added slowly, with stirring, to a solution prepared by adding a cold solution of 4.7 g. of cupric sulfate pentahydrate in 15 ml. of water to a solution of 5.6 g. of potassium cyanide in 10 ml. of water. When the addition of the diazonium salt solution is complete, the solution is heated at 50–55° C. for one hour, then allowed to cool to 40° C. To this solution is added 20 ml. of aqueous ammonia (d.=0.880) and the mixture is stirred one hour at room temperature. The solid product, 2,4-diamino-5-chloro-6-quinazolinecarbonitrile, in crude form, is removed by filtration, washed with dilute aqueous ammonia and with water, and extracted with 70 ml. of boiling 50% aqueous acetic acid. The hot extract is treated with charcoal and filtered. The filtrate, while hot, is diluted with 35 ml. of 2-ethoxyethanol and 70 ml. of aqueous ammonia (d.=0.880). The mixture is cooled and the product, 2,4-diamino-5-chloro-6-quinazolinecarbonitrile, is collected by filtration, washed in turn with water, ethanol and ether, and dried; M.P. 287° C. with decomposition. The product is reacted with diethyl N-(p-aminobenzoyl)-L-aspartate, following the Raney nickel hydrogenation procedure of Example 3(b), but substituting 1.10 g. of 2,4-diamino-5-chloro-6-quinazolinecarbonitrile for the 2,4-diamino-5-methyl-6-quinazolinecarbonitrile hemihydrate, whereby the corresponding product, diethyl N-{p-{[(2,4-diamino-5-chloro-6-quinazolinyl)methyl]-amino}benzoyl}-L-aspartate is obtained; M.P. 198–200° C. By substituting an equivalent amount of diethyl N-(p-aminobenzoyl)-D-aspartate, diethyl N-(p-aminobenzoyl)-DL-aspartate, diethyl N-(p-aminobenzoyl)-L-glutamate, diethyl N-(p-aminobenzoyl)-D-glutamate or diethyl N-(p-aminobenzoyl)-DL-glutamate for the diethyl N-(p-aminobenzoyl)-L-aspartate in this procedure, the corresponding N-quinazolinylmethylaminobenzoyl amino acid esters are obtained:

Diethyl N-{p-{[(2,4-diamino-5-chloro-6-quinazolinyl)methyl]amino}benzoyl}-D-aspartate;
Diethyl N-{p-{[(2,4-diamino-5-chloro-6-quinazolinyl)methyl]amino}benzoyl}-DL-aspartate;
Diethyl N-{p-{[(2,4-diamino-5-chloro-6-quinazolinyl)methyl]amino}benzoyl}-L-glutamate;
Diethyl N-{p-{[(2,4-diamino-5-chloro-6-quinazolinyl)methyl]amino}benzoyl}-D-glutamate;
Diethyl N-{p-{[(2,4-diamino-5-chloro-6-quinazolinyl)methyl]amino}benzoyl}-DL-glutamate.

Example 5

(a) A solution of N-{p-{[(2,4-diamino-6-quinazolinyl)methyl]amino}benzoyl}malonic acid, diethyl ester, hemihydrate (0.95 g.) in hot ethanol (50 ml.) is cooled to 30° C. and treated with 2 N sodium hydroxide (2.2 ml.). The resulting solid product, N-{p-{[(2,4-diamino-6-quinazolinyl)-methyl]amino}benzoyl}malonic acid, disodium salt, tetrahydrate, which separates after standing 18 hours is collected by filtration. The corresponding free acid is obtained by dissolving the salt product in water and treating the solution with 2 molar equivalents of dilute hydrochloric acid. The precipitated free acid is removed by filtration, washed with water and dried. Using an ethanol solution of the free acid product the corresponding potassium, ammonium and ethanolamine di-salts are prepared by treating the solution with 2 molar equivalents of the respective base (potassium hydroxide, ammonia or 2-hydroxy-ethylamine) in an aqueous solution, and recovering the solid product which separates on standing.

By the same procedure but by replacing the ester starting material with an equivalent amount of the corresponding 5-chloro or 5-methyl derivatives, the resulting salt and acid products are:

N-{p-{[(2,4-diamino-5-chloro-6-quinazolinyl)methyl]-amino}benzoyl}malonic acid, disodium salt, hydrate;
N-{p-{[(2,4-diamino-5-methyl-6-quinazolinyl)methyl]-amino}benzoyl}malonic acid, disodium salt, hydrate;

and the corresponding free acids.

(b) The dialkyl ester starting material used in paragraph (a) can be prepared by the following procedure which procedure is illustrative of a general method:

2,4-diamino-6-quinazoline carbonitrile (7.4 g.) and phenylhydrazine (4.72 ml.) in 50% acetic acid (400 ml.) are hydrogenated at ordinary temperature and pressure, using Raney nickel (J. Org. Chem., 1961, 26, 1625) until 1152 ml. of hydrogen gas (at 20° C.) have been absorbed. Acetic acid (200 ml.) is added and the mixture heated to 100° C., filtered to remove catalyst and allowed to cool. The crystalline product which separates is collected. This product is 2,4-diamino-6-quinazolinecarboxaldehyde, phenylhydrazone, acetate salt; M.P. 227–230° C. A portion (5.07 g.) of the product and p-nitrobenzaldehyde (2.73 g.) are heated at reflux for 2 hours in 50% acetic acid (150 ml.). The mixture is cooled, filtered and the filtrate taken to dryness by evaporation. The residue is treated with cold 2 N sodium carbonate and the solid product, 2,4-diamino-6-quinazolinecarboxaldehyde, is collected, washed with water and warm ethanol and dried. A portion (0.94 g.) of the product and di-ethyl-N-(p-aminobenzoyl)malonate (J. Am. Chem. Soc., 1949, 71, 3014; 1.77 g.) in acetic acid (35 ml.) are hydrogenated with Raney nickel until a 1:1 molar ratio of hydrogen gas is absorbed. The solution is filtered, evaporated and the residue treated with 2 N sodium carbonate solution. The product which separates, N-{p-{([2,4-diamino-6-quinazolinyl)methyl]amino}benzoyl}malonic acid, diethyl ester, hemihydrate, is collected; M.P. 194° C. from ethanol. By the same procedure but replacing the quinazolinecarbonitrile with an equivalent amount of the corresponding 5-chloro- or 5-methylquinazolinecarbonitrile, the corresponding 5-chloro- or 5-methylquinazolinylmethylaminobenzoyl malonic acid, diethyl ester starting material for the procedure of paragraph (a) is obtained.

I claim:

1. A member of the group consisting of a dibasic acid compound of formula:

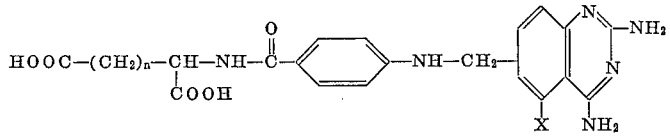

and its corresponding basic di-salts selected from the group consisting of sodium, potassium, calcium, ammonium, 2-hydroxyethylamine and choline salts; where $n$ is the integer 0, 1 or 2 and X is a member selected from the group consisting of hydrogen, chlorine and methyl.

2. An acid compound according to claim 1 where $n$ is 0 and X is hydrogen, which compound is N-{p-{[(2,4-diamino - 6-quinazolinyl)methyl]amino}benzoyl}malonic acid.

3. An acid compound according to claim 1 where $n$ is 1 and X is hydrogen, which compound is N-{p-{[(2,4-diamino - 6 - quinazolinyl)methyl]amino}benzoyl}-L-aspartic acid.

4. An acid compound according to claim 1 where $n$ is 2 and X is hydrogen, which compound is N-{p-{[(2,4-diamino - 6-quinazolinyl)methyl]amino}benzoyl}-L-glutamic acid.

5. An acid compound according to claim 1 where $n$ is 0 and X is a methyl group, which compound is N-{p-{[(2,4 - diamino-5-methyl-6-quinazolinyl)methyl]amino}benzoyl}malonic acid.

6. An acid compound according to claim 1 where $n$ is 1 and X is a methyl group, which compound is N-{p-{[(2,4 - diamino-5-methyl-6-quinazolinyl)methyl]amino}benzoyl}-L-aspartic acid.

7. An acid compound according to claim 1 where $n$ is 2 and X is a methyl group, which compound is N-{p-{[(2,4 - diamino-5-methyl-6-quinazolinyl)methyl]amino}benzoyl}-L-glutamic acid.

8. An acid compound according to claim 1 where $n$ is 0 and X is a chlorine atom, which compound is N-{p-{[(2,4 - diamino-5-chloro-6-quinazolinyl)methyl]amino}benzoyl}malonic acid.

9. An acid compound according to claim 1 where $n$ is 1 and X is a chlorine atom, which compound is N-{p-{[(2,4 - diamino-5-chloro-6-quinazolinyl)methyl]amino}benzoyl}-L-aspartic acid.

10. An acid compound according to claim 1 where $n$ is 2 and X is a chlorine atom, which compound is N-{p-{[(2,4 - diamino-5-chloro-6-quinazolinyl)methyl]amino}benzoyl}-L-glutamic acid.

11. A di-salt compound according to claim 1 where $n$ is 0 and X is hydrogen, which compound is the disodium salt of N-{p-{[(2,4-diamino-6-quinazolinyl)methyl]amino}benzoyl}malonic acid.

12. A di-salt compound according to claim 1 where $n$ is 1 and X is hydrogen, which compound is the disodium salt of N-{p-{[(2,4-diamino-6-quinazolinyl)methyl]amino}benzoyl}-L-aspartic acid.

13. A di-salt compound according to claim 1 where $n$ is 2 and X is hydrogen, which compound is the disodium salt of N-{p-{[(2,4-diamino-6-quinazolinyl)methyl]amino}benzoyl}-L-glutamic acid.

14. A di-salt compound according to claim 1 where $n$ is 0 and X is a methyl group, which compound is the disodium salt of N-{p-{[(2,4-diamino-5-methyl-6-quinazolinylmethyl[amino}benzoyl}malonic acid.

15. A di-salt compound according to claim 1 where $n$ is 1 and X is a methyl group, which compound is the disodium salt of N-{p-{[(2,4-diamon-5-methyl-6-quinazolinyl)methyl]-amino}-L-aspartic acid.

16. A di-salt compound according to claim 1 where $n$ is 2 and X is a methyl group, which compound is the disodium salt of N-{p-{[(2,4-diamino-5-methyl-6-quinazolinyl)methyl]amino}benzoyl}-L-glutamic acid.

17. A di-salt compound according to claim 1 where $n$ is 0 and X is a chlorine atom, which compound is the disodium salt of N-{p-{[(2,4-diamino-5-chloro-6-quinazolinyl)methyl]amino}benzoyl}malonic acid.

18. A di-salt compound according to claim 1 where $n$ is 1 and X is a chlorine atom, which compound is the disodium salt of N-{p-{[(2,4-diamino-5-chloro-6-quinazolinyl)methyl]amino}benzoyl}-L-aspartic acid.

19. A di-salt compound according to claim 1 where $n$ is 2 and X is a chlorine atom, which compound is the disodium salt of N-{p-{[(2,4-diamino-5-chloro-6-quinazolinyl)methyl]amino}benzoyl}-L-glutamic acid.

No references cited.

ALEX MAZEL, Primary Examiner

R. J. GALLAGHER, Assistant Examiner

U.S. Cl. X.R.

424—251